United States Patent
Lu

(10) Patent No.: US 11,089,522 B2
(45) Date of Patent: Aug. 10, 2021

(54) METHOD AND DEVICE FOR ACCESSING A NETWORK, AND USER EQUIPMENT

(71) Applicant: BAICELLS TECHNOLOGIES CO. LTD., Beijing (CN)

(72) Inventor: Yang Lu, Beijing (CN)

(73) Assignee: Baicells Technologies Co. Ltd., Beijing (CN)

( * ) Notice: Subject to any disclaimer, the term of this patent is extended or adjusted under 35 U.S.C. 154(b) by 112 days.

(21) Appl. No.: 16/086,079

(22) PCT Filed: Mar. 17, 2017

(86) PCT No.: PCT/CN2017/077148
§ 371 (c)(1),
(2) Date: Sep. 18, 2018

(87) PCT Pub. No.: WO2017/157339
PCT Pub. Date: Sep. 21, 2017

(65) Prior Publication Data
US 2019/0116529 A1     Apr. 18, 2019

(30) Foreign Application Priority Data
Mar. 18, 2016   (CN) .......................... 201610158992.X

(51) Int. Cl.
*H04W 36/00*   (2009.01)
*H04L 29/06*   (2006.01)
(Continued)

(52) U.S. Cl.
CPC ..... *H04W 36/0069* (2018.08); *H04L 63/0892* (2013.01); *H04L 63/102* (2013.01);
(Continued)

(58) Field of Classification Search
CPC ....... H04W 12/06; H04W 60/00; H04W 8/08; H04W 8/04; H04W 76/11; H04W 76/27;
(Continued)

(56) References Cited

U.S. PATENT DOCUMENTS

2009/0232019 A1* 9/2009 Gupta .................. H04W 8/082
                                                    370/252
2012/0159151 A1  6/2012 Janakiraman et al.
(Continued)

FOREIGN PATENT DOCUMENTS

CN      101521873 A    9/2009
CN      101534500 A    9/2009
(Continued)

OTHER PUBLICATIONS

International Search Report and Written Opinion for International Application No. PCT/CN2017/077148, dated Jul. 10, 2017 (Jul. 10, 2017)—11 pages; English Translation of same—6 pages.

*Primary Examiner* — Asad M Nawaz
*Assistant Examiner* — Najeeb Ansari
(74) *Attorney, Agent, or Firm* — Culhane Meadows PLLC; Stephen J. Weed

(57) ABSTRACT

A method and a device for accessing a network by a User Equipment, and a User Equipment are provided. The method includes obtaining a second network identifier of a second network in which a second cell is and an identifier of a second service provider selected by the UE from service providers supported by the second network, when the UE moves from a first cell to the second cell; sending an access request carrying a Globally Unique Temporary Identifier of the UE to the second network to access the second network, when the second network identifier is different from a first network identifier of a first network in which the first cell is, or when the identifier of the second service provider is different from an identifier of a first service provider with
(Continued)

which the UE registers, in service providers supported by the first network.

7 Claims, 10 Drawing Sheets

(51) Int. Cl.
| | | |
|---|---|---|
| *H04W 8/26* | (2009.01) | |
| *H04W 48/18* | (2009.01) | |
| *H04W 8/16* | (2009.01) | |
| *H04W 76/11* | (2018.01) | |
| *H04W 12/06* | (2021.01) | |
| *H04W 12/08* | (2021.01) | |
| *H04W 36/14* | (2009.01) | |
| *H04W 60/00* | (2009.01) | |
| *H04W 60/04* | (2009.01) | |
| *H04W 8/12* | (2009.01) | |

(52) U.S. Cl.
CPC .............. *H04W 8/16* (2013.01); *H04W 8/26* (2013.01); *H04W 12/06* (2013.01); *H04W 12/08* (2013.01); *H04W 36/0038* (2013.01); *H04W 36/0066* (2013.01); *H04W 36/14* (2013.01); *H04W 48/18* (2013.01); *H04W 60/00* (2013.01); *H04W 76/11* (2018.02); *H04W 8/12* (2013.01); *H04W 60/04* (2013.01)

(58) Field of Classification Search
CPC ... H04W 60/04; H04W 36/0022; H04W 8/02; H04W 76/10; H04W 48/18; H04W 36/14
See application file for complete search history.

(56) References Cited

U.S. PATENT DOCUMENTS

| | | | | |
|---|---|---|---|---|
| 2012/0214493 | A1* | 8/2012 | Suh ................. | H04W 36/0066 455/437 |
| 2013/0157661 | A1* | 6/2013 | Bhaskaran ........... | H04W 60/00 455/436 |
| 2013/0344890 | A1* | 12/2013 | Hahn .................... | H04W 60/00 455/456.1 |
| 2015/0201394 | A1* | 7/2015 | Qu ........................ | H04W 4/021 455/456.1 |
| 2016/0183156 | A1* | 6/2016 | Chin ................. | H04W 36/0022 370/331 |
| 2016/0227471 | A1* | 8/2016 | De Foy ................. | H04W 48/18 |
| 2017/0046686 | A1* | 2/2017 | Yoon .................... | G06Q 20/327 |
| 2017/0127324 | A1* | 5/2017 | Liang ................... | H04L 61/1511 |
| 2017/0150467 | A1* | 5/2017 | Tamura ................. | H04W 60/00 |
| 2017/0188280 | A1* | 6/2017 | Watfa .................... | H04W 36/12 |
| 2017/0257801 | A1* | 9/2017 | Toth ..................... | H04W 64/003 |
| 2018/0317200 | A1* | 11/2018 | Kim .................. | H04W 52/0212 |
| 2018/0324652 | A1* | 11/2018 | Ryu ....................... | H04W 8/08 |
| 2018/0368038 | A1* | 12/2018 | Reddiboyana ........ | H04W 76/15 |

FOREIGN PATENT DOCUMENTS

| | | |
|---|---|---|
| CN | 102769848 A | 11/2012 |
| WO | 2015172088 A1 | 11/2015 |

* cited by examiner

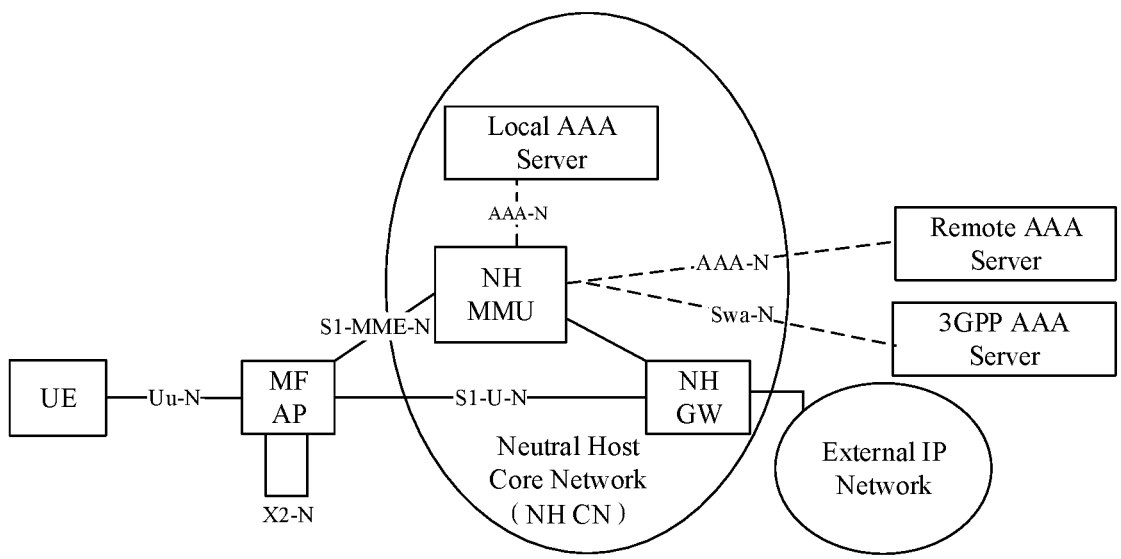

Fig. 1

Obtaining a second network identifier of a second network in which a second cell is located and an identifier of a second service provider selected by a UE from service providers supported by the second network, when the UE moves from a first cell to the second cell — 11

Sending an access request carrying a GUTI of the UE to the second network to access the second network, when the second network identifier is different from a first network identifier of the first network in which the first cell is located, or when the identifier of the second service provider is different from an identifier of an first service provider with which the UE registers in service providers supported by the first network — 12

Fig. 2

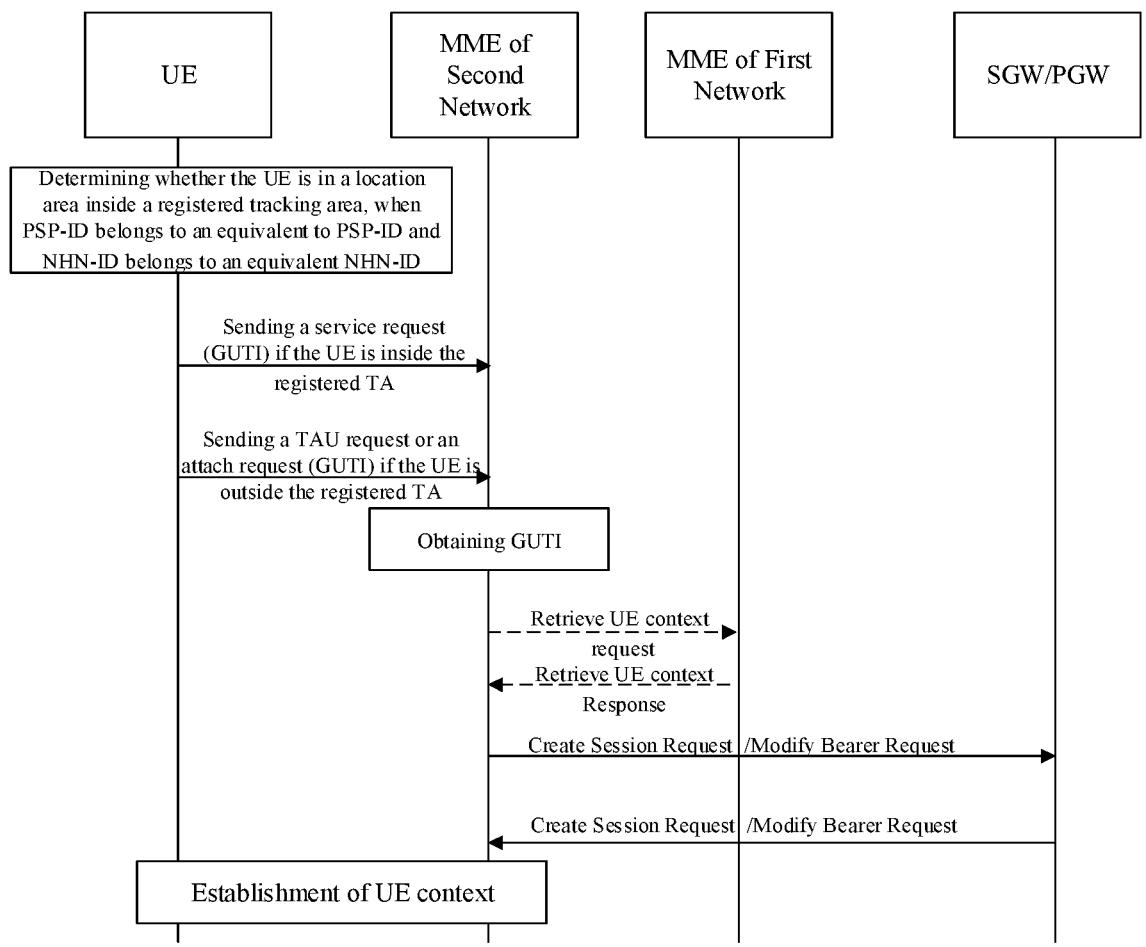

Fig. 10

Obtaining a second network identifier of a second network in which a second cell is located and an identifier of a second service provider selected by a UE from service providers supported by the second network, when the UE moves from a first cell to the second cell — 61

Sending an access request carrying a GUTI of the UE to the second network, when the identifier of the second service provider is different from the identifier of the first service provider and is in an identifier set of service providers equivalent to the first service provider, and the second network identifier is the same as the first network identifier — 62

Fig. 11

METHOD AND DEVICE FOR ACCESSING A NETWORK, AND USER EQUIPMENT

CROSS-REFERENCE TO RELATED APPLICATION

The present application is a U.S. national phase application of a PCT Application No. PCT/CN2017/077148 filed on Mar. 17, 2017, which claims a priority of a Chinese patent application No. 201610158992.X filed in China on Mar. 18, 2016, the disclosures of which is incorporated herein in their entirety by reference.

TECHNICAL FIELD

The present disclosure relates to a field of communication technology, and, in particular, to a method for accessing a network by a User Equipment (UE), a device for accessing a network by a UE, a chip, and a UE.

BACKGROUND

MulteFire is a new radio access technology based on a Long Term Evolution (LTE), and may operate independently in a non-licensed frequency band without an aid of a licensed frequency band.

The MulteFire expands the LTE into the non-licensed frequency band, and introduces a mechanism called Listen Before Talk (LBT) at a physical layer. The LBT is similar to a carrier sense technique in a Wireless Fidelity (WiFi), so as to fairly compete air-interface resources with a device operating in the non-licensed frequency band.

The MulteFire may operate in a network infrastructure of a current Third Generation Partnership Project (3GPP), interface with a 3GPP core network, provide offloads to capacity, coverage and data of a traditional mobile network operator by means of the non-licensed frequency band, and enhance a quality of service of the traditional mobile network operator by acting as a supplement of the licensed frequency band or a hot spot.

Furthermore, the MulteFire also introduces a new network infrastructure by providing a Neutral Host (NH) network planned unitedly and self-organized. A service provider, a device provider or a user may participate in deployment of the network, and the network deployed by any one may provide services to various service providers including an Internet Service Provider, a Cable TV provider, a Mobile Network Operator, a service provider for an enterprise and an public area, and may provide authentication and network access to a UE having no Subscriber Identity Module (SIM) card.

An alliance for advancing the MulteFire has been established and operated at present so as to promote development of global technical specifications of the MulteFire, push an evolution of the MulteFire forward, and ensure that a device based on the MulteFire and other devices operating in the non-licensed frequency band (such as the WiFi) compete the non-licensed frequency band fairly.

A core network (CN) of the NH network provides a neutral network for the MulteFire which is planned uniformly and self-organized, a UE accessing the NH network is authenticated and authorized by an Authentication, Authorization, Accounting (AAA) server through an Extensive Authentication Protocol (EAP). However, the UE accessing the NH network does not support handover to a Radio Access Network (RAN) of a 3GPP network.

In a NH network mode of the MulteFire, in order to support various service providers including the Internet Service Provider, the Cable TV provider, the Mobile Network Provider, the service provider for an enterprise and a public area, a Participating Service Provider Identifier (PSP-ID) is introduced. A UE may store certificates of multiple Participating Service Providers (PSPs) for accessing networks of the multiple PSPs. In the NH network mode of the MulteFire, the NH nework and the networks of the PSPs are independent from each other. Each MF Access Point (AP) belongs to one NH network and is identified by a Neutral Host Identifier (NHN-ID). Each NH network may be provided to one or more service providers, i.e., each NH AP and each NH MME may support multiple PSP-IDs, the NH MME may be connected to AAA servers of the multiple PSPs and supports authentication, authorization or accounting performed to the UE having different PSP-IDs. The PSP-IDs may be divided into two types, i.e., a long format and a short format. A PSP-ID having the short format may be transmitted to the UE through a system broadcast of the RAN and indicates a service provider supported by the MulteFire.

In a current LTE technology, when the UE enters a location area outside a registered Tracking Area (TA) of the UE and a service network selected by the UE has changed, the UE needs to initiate an attach procedure based on an International Mobile Subscriber Identification Number (IMSI), and incorporates the IMSI in an attach request. After the MME receives the attach request carrying the IMSI, the MME needs authenticate the UE firstly and then perform network registration to the UE.

A LTE network and the network of a service provider in the LTE system is consistent and identified by a Public Land Mobile Network (PLMN)-Identifier, i.e., a PLMN-ID. When a PLMN selected by the UE is changed, the UE initiates the attach procedure based on the IMSI. After the MME receives the attach request from the UE, the MME needs to perform the authentication and the network registration of the UE again. Since the NH network may provide two kinds of network identifiers, i.e., the NHN-ID and the PSP-ID, massive network signalings related to the authentication and registration of the UE may be generated in the network due to frequent attach procedures of the UE if the UE initiates the attach procedures related to the PSP when the NHN-ID is changed or the PSP-ID is changed, therefore increasing signaling loads in the network and affecting network performance adversely.

SUMMARY

An objective of the present disclosure is to provide a method and a device for accessing a network by a User Equipment and a User Equipment, so as to address a problem in the related art that because frequent attach procedures of a UE may bring massive signalings related to authentication and network registration procedures of the UE, signaling loads in the network are increased and a network performance is affected adversely.

For achieving the above objective, in one aspect, a method for accessing a network by a User Equipment (UE) is provided in some embodiments of the present disclosure, and the method includes: obtaining a second network identifier of a second network in which a second cell is located and an identifier of a second service provider selected by the UE from service providers supported by the second network, when the UE moves from a first cell to the second cell; and sending an access request carrying a Globally Unique Temporary identifier (GUTI) of the UE to the second network to access the second network, when the second network identifier is different from a first network identifier of a first network in which the first cell is located, or when the identifier of the second service provider is different from an identifier of a first service provider with which the UE registers, in service providers supported by the first network.

In another aspect, some embodiments of the present disclosure also provide a device for accessing a network by a UE. The device includes: an obtaining module configured to obtain a second network identifier of a second network in which a second cell is located and an identifier of a second service provider selected by the UE from service providers supported by the second network, when the UE moves from a first cell to the second cell; and a sending module configured to send an access request carrying a Globally Unique Temporary identifier (GUTI) of the UE to the second network to access the second network, when the second network identifier is different from a first network identifier of a first network in which the first cell is located, or when the identifier of the second service provider is different from an identifier of a first service provider with which the UE registers, in service providers supported by the first network.

In another aspect, some embodiments of the present disclosure provide a User Equipment (UE), and the UE includes: a receiver configured to receive a second network identifier of a second network in which a second cell is located and an identifier of a second service provider selected by the UE from service providers supported by the second network, when the UE moves from a first cell to the second cell; and a processor connected to the receiver and configured to perform a step of generating an access request carrying a Globally Unique Temporary identifier (GUTI) of the UE to the second network to access the second network, when the second network identifier is different from a first network identifier of a first network in which the first cell is located, or when the identifier of the second service provider is different from an identifier of a first service provider with which the UE registers, in service providers supported by the first network; and a transmitter connected to the processor and configured to send the access request carrying the GUTI of the UE to the second network to access the second network.

The above technical solutions of the present at least provide the following beneficial effects: in the method and the device for accessing a network by a User Equipment (UE) and the User Equipment, the UE sends an access request carrying a Globally Unique Temporary Identifier (GUTI) of the UE when the second needs identifier is different from the first network identifier, or when the identifier of the second service provider is different from the identifier of the first service provider, so that a network side may obtain context information of the UE in the network according to the GUTI, thereby avoiding procedures of authentication, bearer establishment and/or bearer release of the UE, lowering signaling loads in the network, and enhancing the network performance.

BRIEF DESCRIPTION OF THE DRAWINGS

FIG. 1 is a schematic diagram of an architecture of a NH network mode of a MulteFire network;

FIG. 2 is a first flowchart of basic steps of a method for accessing a network by a User Equipment (UE) provided in some embodiments of the present disclosure;

FIG. 10 is a signaling diagram of a method for accessing a network by a UE provided in some embodiments of the present disclosure;

FIG. 11 is a flowchart of a method for accessing a network by a UE provided in some embodiments of the present disclosure;

DETAILED DESCRIPTION

Figure 3:
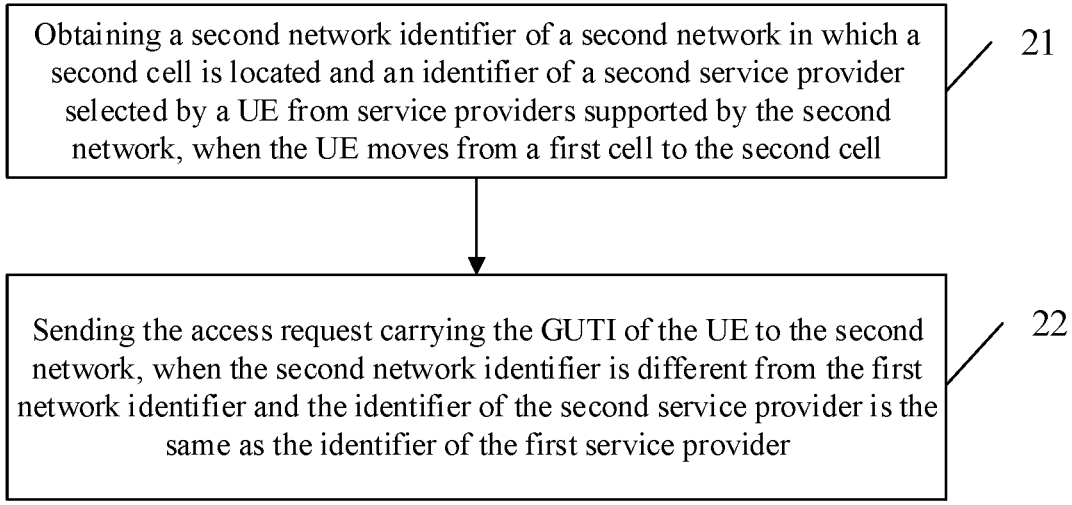
FIG. 3 is a second flowchart of basic steps of a method for accessing a network by a UE provided in some embodiments of the present disclosure.

To make technical problems to be solved, technical solutions, and advantages of the present disclosure more clear, specific embodiments will be described hereinafter in details in conjunction with the drawings.

As shown in FIG. 1, in a Neutral Host (NH) network mode of a MulteFire network, an access point (AP) of the MulteFire network is connected to a NH Core Network (CN). The NH CN is similar to a Long Term Evolution (LTE) Core Network of a Third Generation Partner Project (3GPP) and includes a NH Mobility Management Entity (MME), a NH Gateway (GW) and a NH Authentication, Authorization, and Accounting (AAA) server.

It should be noted that, in the NH mode of the MulteFire network provided in the embodiments of the present disclosure, a network operator and a service provider are independent from each other, wherein, a network identifier of a NH network is represented by NHN-ID. The NHN-ID may be configured autonomously by a Radio Access Network (RAN) or unitedly assigned by an Operation & Maintenance Center, and is transmitted through a system broadcast of the RAN. A User Equipment (UE) performs a network selection procedure and a cell re-selection procedure according to the NHN-ID. The NH Core Network assigns a Globally Unique Temporary Identifier (GUTI) to the UE in the NH network, i.e., the GUTI is uniquely assigned in the NH network having the NHN-ID. The MME may support a plurality of NH networks. A logical MME of each of the plurality of NH networks is identified by a MME Code (MMEC). The MME may be uniquely determined according to the NHN-ID and the MMEC. An identifier of a service provider is identified by a PSP-ID. An Authentication, Authorization and Accounting (AAA) server for the UE may be determined by the MulteFire network through the PSP-ID. PSP-IDs may be divided into two types: i.e., a long-format or a short-format. In order to save air-interface resources, the system broadcast of the RAN only transmits a PSP-ID having the short-format supported by the AP of the MulteFire network.

As shown in FIG. 2, some embodiments of the present disclosure provide a method for accessing a network by a User Equipment (UE). The method includes steps 11-12.

Step 11: obtaining a second network identifier of a second network in which a second cell is located and an identifier of a second service provider selected by the UE from service providers supported by the second network, when the UE moves from a first cell to the second cell.

In this step, the UE may perform the cell re-selection procedure when moving from the first cell to the second cell. The UE performs the cell re-selection procedure in cells having a same first network identifier as that of the first network in which the first cell is located. If the UE fails to find a suitable cell from the cells having the same first network identifier, such as if signals in the cells do not meet a requirement or a system broadcast indicates the cells are cells barred from being accessed or are blocked cells, then the UE can only select a cell having a network identifier different from the first network identifier. If the UE finds a suitable cell, the UE camps on the cell, and a NH network having a NHN-ID in which the camped-on cell is located is taken as a service network. If the UE fails to find a suitable cell from networks corresponding to all network identifiers, the UE may change a service provider, i.e., select a new service provider having a new PSP-ID, and re-select a network and a suitable cell according to the new PSP-ID.

When the UE finishes the cell re-selection procedure, the UE needs to obtain the second network identifier of the second network in which the second cell is located, the identifier of the second service provider selected by the UE from the service providers supported by the second network, the first network identifier of the first network in which the first cell is located, and an identifier of a first service provider with which the UE registers in service providers supported by the first network. Specifically, the first network and the second network may be the same or different, and the identifier of the first service provider and the identifier of the second service provider may be the same or different.

Step 12: sending an access request carrying the GUTI of the UE to the second network to access the second network, when the second network identifier is different from the first network identifier of the first network in which the first cell is located, or when the identifier of the second service provider is different from the identifier of the first service provider with which the UE registers in the service providers supported by the first network.

In this step, after the UE finishes the cell re-selection procedure and obtains the first network identifier, the second network identifier, the identifier of the first service provider and the identifier of the second service provider, the UE needs to determine whether the second network identifier has changed relative to the first network identifier, and whether the identifier of the second service provider has changed relative to the identifier of the first service provider.

In a case that the second network identifier has changed or the identifier of the second service provider has changed, the UE stills sends the access request carrying the GUTI of the UE to a core network of the second network according to the method provided in the above embodiment of the present disclosure, so that the core network obtains a context of the UE in the NH network according to the GUTI in the access request after the core network receives the access request, thus avoiding that the core network performs the authentication procedure and the network registration procedure to the UE again, thereby lowering signaling loads of the MulteFire network and enhancing a network performance.

Figure 4:
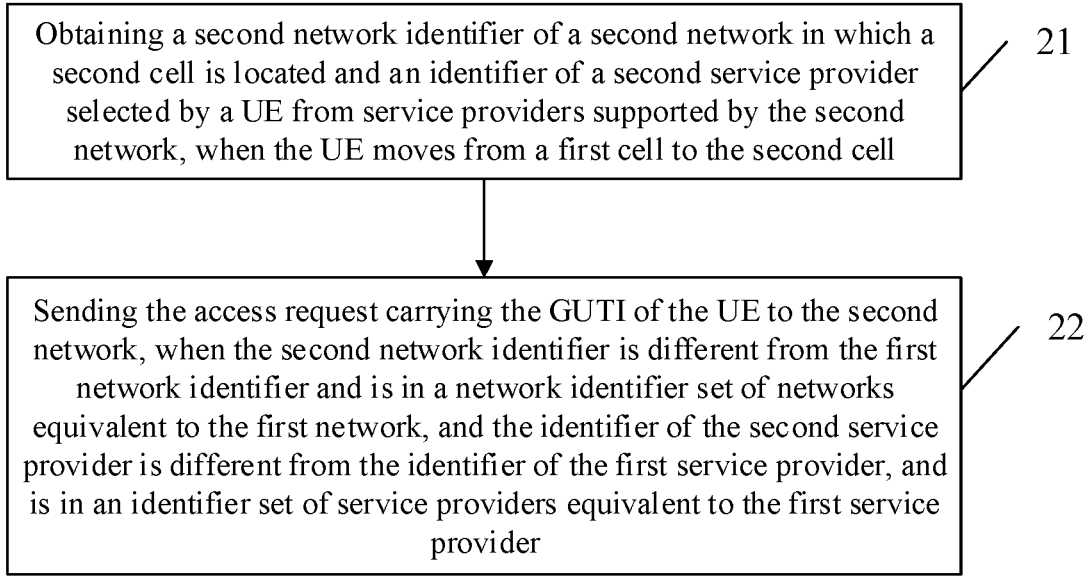
FIG. 4 is a third flowchart of basic steps of a method for accessing a network by a UE provided in some embodiments of the present disclosure.

As shown in FIG. 3 and FIG. 4, some embodiments of the present disclosure provide a method for accessing a network by a User Equipment (UE). The method includes the following steps.

Step 21: the same as the above step 11.

Step 22: sending the access request carrying the GUTI of the UE to the second network, when the second network identifier is different from the first network identifier and the identifier of the second service provider is the same as the identifier of the first service provider; or Step 23: sending the access request carrying the GUTI of the UE to the second network, when the second network identifier is different from the first network identifier and is in a network identifier set of networks equivalent to the first network, and the identifier of the second service provider is different from the identifier of the first service provider, and is in an identifier set of service providers equivalent to the first service provider.

Step 22 is a first implementation of the embodiment of the present disclosure. Specifically, when the second network identifier is different from the first network identifier, the identifier of the second service provider may be the same as or different from the identifier of the first service provider. In a case that the identifier of the first service provider is the same as the identifier of the second service provider, the UE sends the access request carrying the GUTI of the UE to the second network, so that the MulteFire network may obtain context information of the UE according to the GUTI and avoiding re-authentication and re-authorization of the UE. In a case that the identifier of the second service provider is different from the identifier of the first service provider, the UE initiates an attach procedure based on a PSP to the second network, and the network side performs the authentication procedure and the network registration procedure of the UE again. Further, the UE sends the access request carrying the GUTI of the UE to the second network, when the second network identifier is different from the first network identifier and the second network identifier is in the network identifier set of networks equivalent to the first network, and the identifier of the second service provider is the same as the identifier of the first service provider.

It is noted that, if subscription information of the UE in the Authentication, Authorization and Accounting server of the first service provider includes information about a identifier set of service providers equivalent to the first service provider, this means that the core network of the first network may share the context information of the UE when the UE accesses the service providers equivalent to the first service provider and re-authentication of the UE is not needed; and/or if the subscription information of the UE in the Authentication, Authorization and Accounting server of the first service provider includes information about the network identifier set of networks equivalent to the first network, this means that the core network may share the context information of the UE and the re-authentication of the UE is not needed when the UE registers with the first service provider and accesses the networks equivalent to the first network. A list of Tracking Area Identifier (TAI) configured for the UE by the core network may include a TA related to any NHN-ID.

Step 23 may include an implementation based on the above equivalent service providers and the equivalent networks, i.e., a second implementation of the embodiment of the present disclosure. Specifically, in a case that the identifier of the second service provider is different from the identifier of the second service provider, it needs further to determine whether the identifier of the second service provider is in the identifier set of service providers equivalent to the first service provider. If the identifier of the second service provider is not in the identifier set of service providers equivalent to the first service provider, the UE initiates the attach procedure based on the PSP to the second network, and the network performs the authentication procedure and the network registration procedure of the UE again. If the identifier of the second servicer provider is in the identifier set of service providers equivalent to the first service provider, it further needs to determine whether the second network identifier is in the network identifier set of networks equivalent to the first network. If the second network identifier is in the identifier set of networks equivalent to the first network, the UE sends the access request carrying the GUTI of the UE to the second network, so that the network obtains the context information of the UE according to the GUTI, thus avoiding the re-authentication of the UE. If the second network identifier is not in the network identifier set of networks equivalent to the first network, the UE initiates the attach procedure based on the PSP to the second network, and the network performs the authentication procedure and the network registration procedure of the UE again.

The embodiment of the present disclosure defines a relationship between the identifier of the second service provider and the identifier of the first service provider directing to a case that the second network identifier is different from the first network identifier, to describe the technical solution of the present disclosure more clearly. The method in the present disclosure may avoid the re-authentication, the re-authorization or the like for the UE, reduce signaling loads on the network, and enhance network performance.

Figure 5:
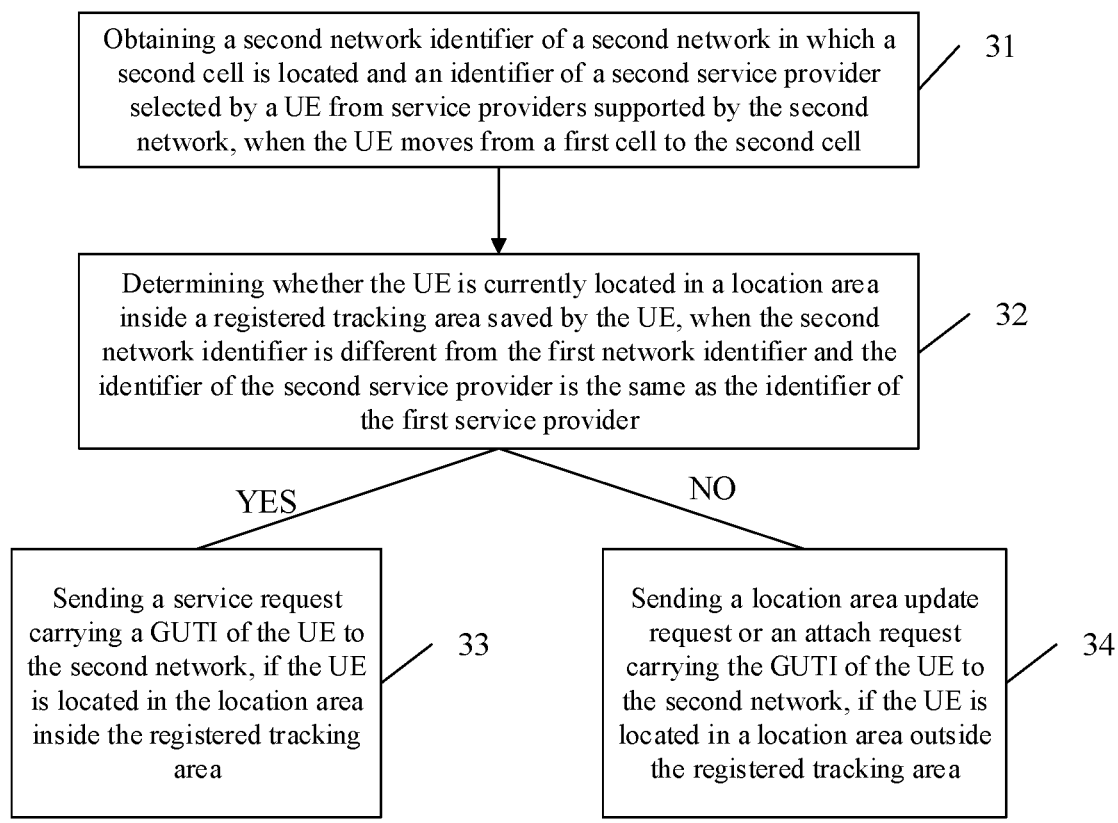
FIG. 5 is a flowchart of a method for accessing a network by a UE provided in some embodiments of the present disclosure.

As shown in FIG. 5, some embodiments of the present disclosure provide a method for accessing a network by a UE. The method includes steps 31-34.

Step 31: the same as the above step 11.

Step 32: determining whether the UE is currently located in a location area inside a registered tracking area saved by the UE, when the second network identifier is different from the first network identifier and the identifier of the second service provider is the same as the identifier of the first service provider.

Step 33: sending a service request carrying the GUTI of the UE to the second network, if the UE is located in the location area inside the registered tracking area.

Step 34: sending a location area update request or an attach request carrying the GUTI of the UE to the second network, if the UE is located in a location area outside the registered tracking area.

This embodiment of the present disclosure is directed to a case that the second network identifier is different from the first network identifier and the identifier of the second service provider is the same as the identifier of the first service provider, i.e., the PSP-ID is unchanged and the NHN-ID is changed. When the NHN-ID selected by the UE is changed, the UE may initiate a service request procedure to change a state of the UE from an idle state to a connected state, or the UE may initiate a Tracking Area Update (TAU) procedure or the attach procedure based on the GUTI, to inform the core network that a service location area of the UE has changed.

Figure 6:
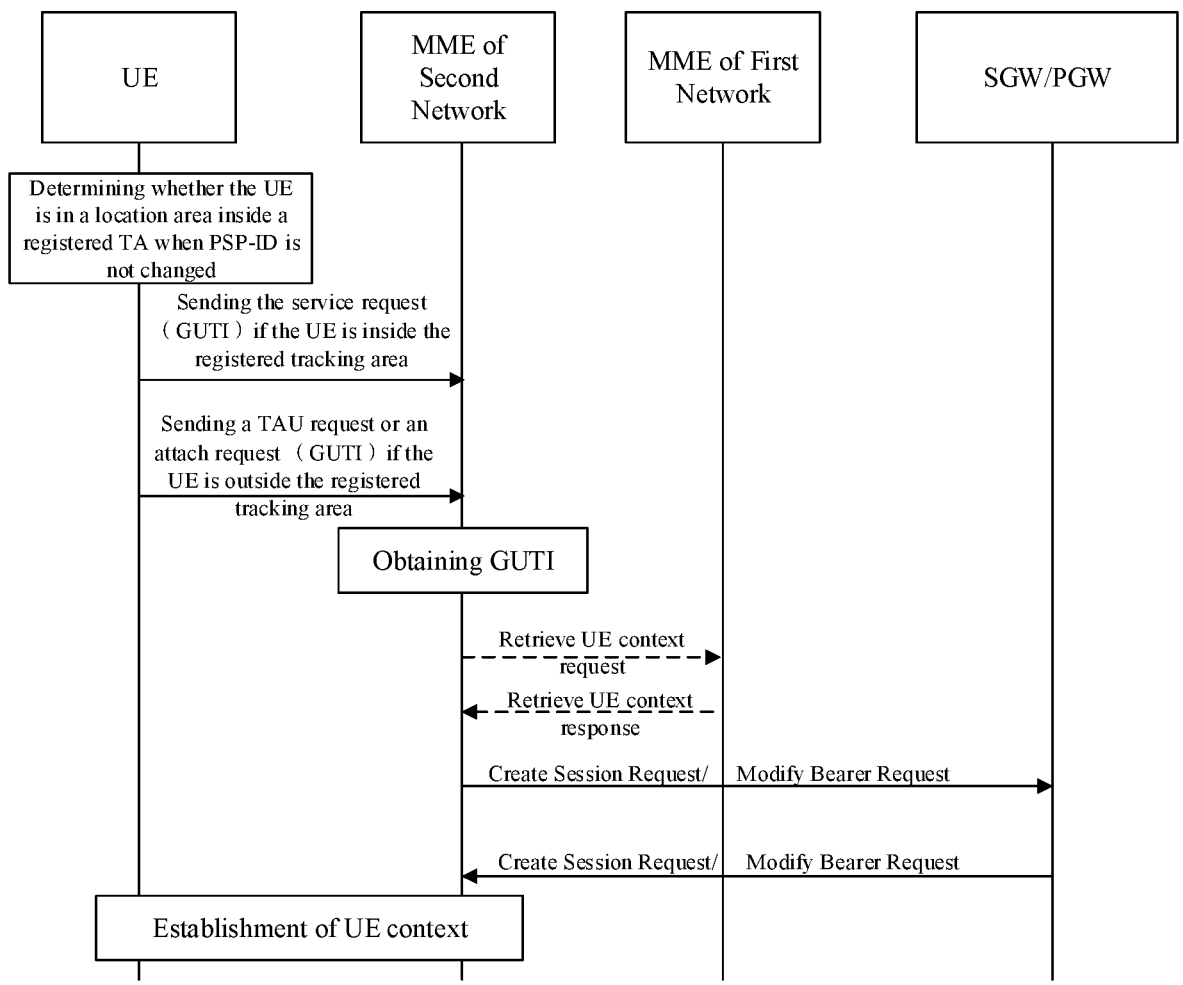
FIG. 6 is a signaling diagram of a method for accessing a network by a UE provided in some embodiments of the present disclosure.

Specifically, as shown in FIG. 6, when the UE is located in the location area inside the registered tracking area (TA) and traffic for the UE arrives or a paging message is received by the UE, the UE may initiate the service request (SR) procedure to change the state of the UE from the idle state to the connected state. When the UE moves into a location area outside a registered TA, the UE may initiate the TAU procedure or the attach procedure based on the GUTI, to inform the core network that the service location area of the UE has changed. In this embodiment, the location area inside the registered tracking area of the UE may include any location area in any NH network. Because the UE still selects a previous PSP-ID, the TAU request or the attach request carries the GUTI assigned to the UE by the core network in respect of the NH network having the previous NHN-ID, but does not carry the PSP-ID. When a MME receives the TAU request or the attach request sent by the UE, the MME requests context information of the UE from a previous MME to which the UE registered, according to the GUTI, and a NHN-ID of a NH network currently serving the UE is updated with a new NHN-ID (i.e., a second network identifier). The context information of the UE includes a PSP-ID of a PSP to which the UE previously registered and security context information of the UE. After the MME successfully obtains the context information of the UE, the MME may update the NHN-ID of the NH network currently serving the UE, without performing the authorization procedure of the UE again, initiating a Create Session Request to a new service gateway (SGW) to create a session in the SGW, or sending a Modify Bearer Request to the SGW to inform the SGW of the MME with which the UE currently registers. If a Packet Data Gateway (PGW) registers a location report event to the MME, the MME may carry User Location Information in the Create Session Request or the Modify Bearer Request to indicate the NHN-ID selected currently by the UE. The SGW forwards this information to the PGW so that a Policy, Control, and Charging (PCC) entity uses a specific PCC policy for the NH network having the NHN-ID and currently serving the UE. If the MME fails to successfully obtain the context information of the UE through the NHN-ID and the GUTI, the MME sends a TAU reject message to the UE. After the UE receives the TAU reject message sent by the MME, the UE may initiate the attach procedure based on the PSP and carry the PSP-ID in the attach request so that the core network performs the authorization procedure and the network registration procedure of the UE again.

In order to illustrate the method for accessing a network by the UE provided in some embodiments of the present disclosure, a case in which the second network identifier and the first network identifier are the same and the identifier of the second service provider and the identifier of the first service provider are the same is described hereinafter, i.e. the PSP-ID is not changed and the NHN-ID is not changed. As shown in FIG. 6, in the case in which the PSP-ID is not changed and the NHN-ID is not changed and in the case in which the PSP-ID is not changed and the NHN-ID is changed, operations of the UE are the same, and thus are not described again.

It should be explained that in a case that the subscription information of the UE in the Authentication, Authorization, and Accounting server of the first service provider does not include information about the identifier set of service providers equivalent to the first service provider, whether the second network identifier is the same as the first network identifier or not, the UE needs to initiate the attach procedure based on the PSP to perform the authentication procedure and the network registration procedure directed to the PSP having the new PSP-ID as long as the identifier of the second service provider is different from the identifier of the first service provider. Since the MME does not need to obtain the context information of the UE in the network, the attach request of the UE only needs to carry the selected PSP-ID. After the MME receives the attach request sent by the UE, the MME determines a corresponding AAA server according to the PSP-ID carried in the attach request. The MME performs the authentication and authorization procedure to the UE through the AAA server. After the authentication and authorization procedure to the UE is successful performed through the AAA server corresponding to the PSP-ID, the MME establishes a default bearer and network registration for the UE.

In some embodiments of the present disclosure, if the subscription information of the UE in the Authentication, Authorization and Accounting server of the first service provider includes information about the network identifier set of networks equivalent to the first network, this means that the core network may share the context information of the UE and re-authentication of the UE is not needed when the UE registers with the first service provider and accesses the networks equivalent to the first network.

Figure 7:
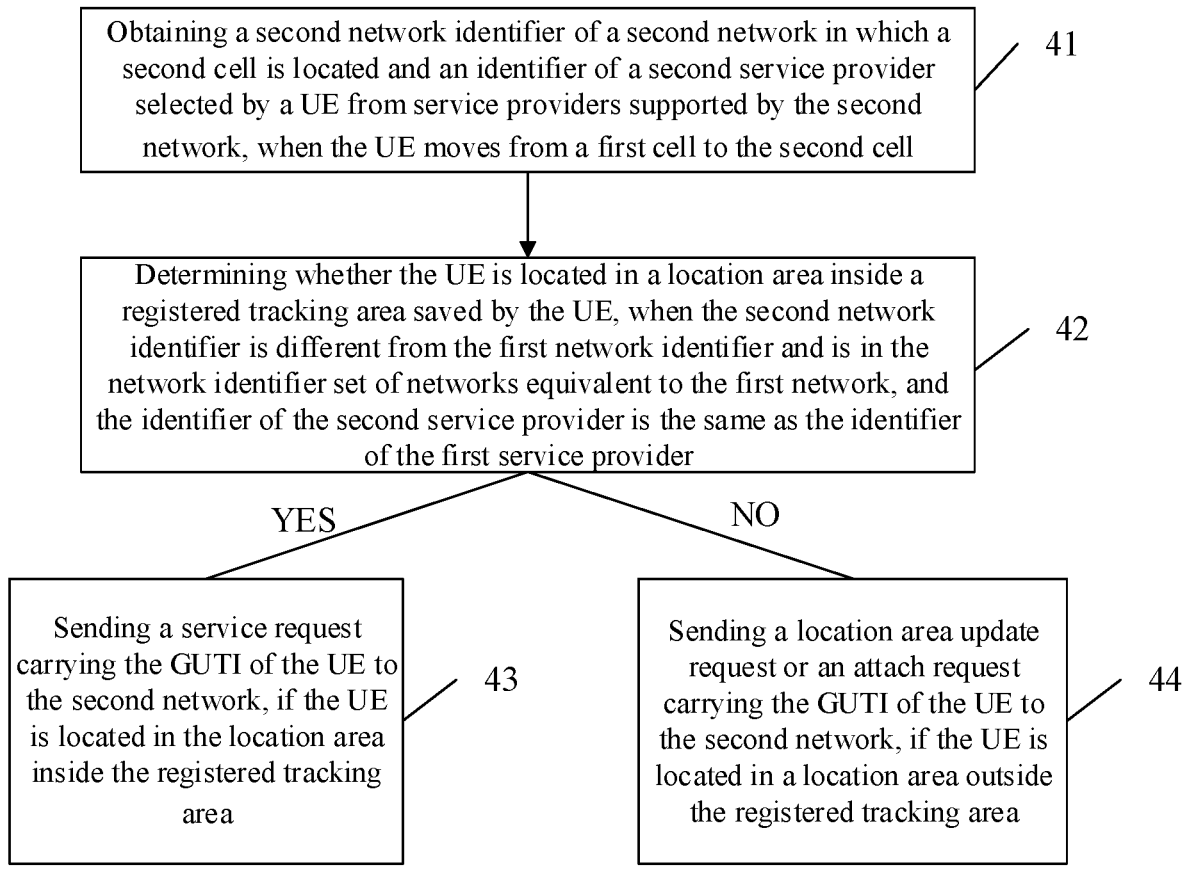
FIG. 7 is a flowchart of a method for accessing a network by a UE provided in some embodiments of the present disclosure.

As shown in FIG. 7, some embodiments of the present disclosure provide a method for accessing a network by a UE. The method includes steps 41-44.

Step 41: the same as the above step 11.

Step 42: determining whether the UE is located in a location area inside a registered tracking area saved by the UE, when the second network identifier is different from the first network identifier and is in the network identifier set of networks equivalent to the first network, and the identifier of the second service provider is the same as the identifier of the first service provider;

Step 43: sending the service request carrying the GUTI of the UE to the second network, if the UE is located in the location area inside the registered tracking area.

Step 44: sending the location area update request or the attach request carrying the GUTI of the UE to the second network, if the UE is located in a location area outside the registered tracking area.

This embodiment of the present disclosure is directed to a case that the second network identifier is different from the first network identifier and is in the network identifier set of networks equivalent to the first network, and the identifier of the second service provider is the same as the identifier of the first service provider, i.e., the PSP-ID is unchanged and the NHN-ID is changed, and the NHN-ID is an equivalent NHN-ID, the UE may initiate the service request procedure to change the state of the UE from the idle state to the connected state, or the UE may initiate the TAU procedure or the attach procedure based on the GUTI, to inform the core network that the service location area of the UE has changed.

Figure 8:
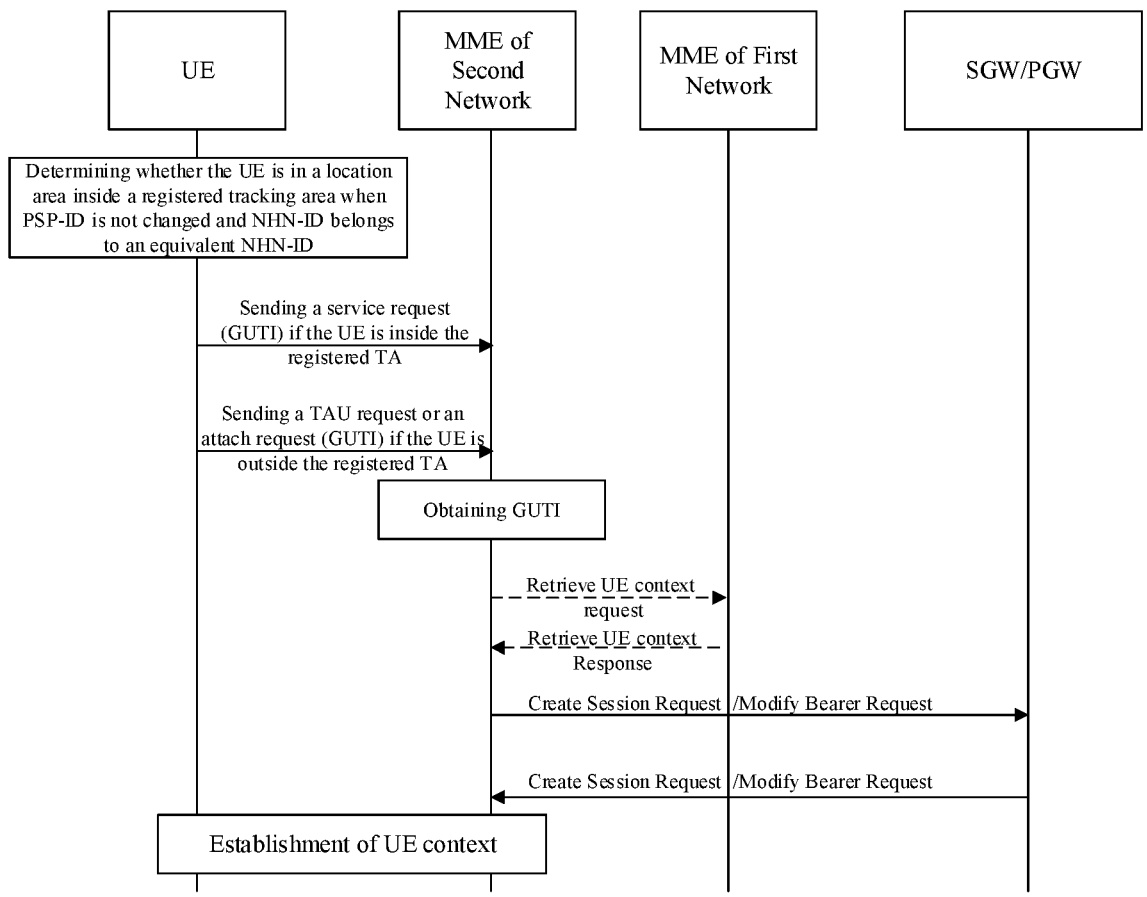
FIG. 8 is a signaling diagram of a method for accessing a network by a UE provided in some embodiments of the present disclosure.

Specifically, as shown in FIG. 8, when the UE is located in the location area inside the registered TA and traffic for the UE arrives or the paging message is received by the UE, the UE may initiate the SR procedure to change the state of the UE from the idle state to the connected state. When the UE moves into a location area outside the registered TA, the UE may initiate the TAU procedure or the attach procedure based on the GUTI, to inform the core network that the serving location area of the UE has changed. In this embodiment, the location area inside the registered TA of the UE may include location areas in the networks equivalent to the first network only. The TAU request or the attach request carries the GUTI assigned to the UE by the core network in respect of the NH network having the previous NHN-ID. When a MME receives the TAU request or the attach request sent by the UE, the MME requests context information of the UE from a previous MME with which the UE registered, according to the GUTI, and a NHN-ID of a NH network currently serving the UE is updated with a new NHN-ID (i.e., a second network identifier). The context information of the UE includes a PSP-ID of a PSP with which the UE previously registered and security context information of the UE. After the MME successfully obtains the context information of the UE, the MME may update the NHN-ID of the NH network currently serving the UE, without performing the authorization procedure of the UE again, initiating the Create Session Request to the new SGW to create a session in the SGW, or sending the Modify Bear Request to the SGW to inform the SGW of the MME with which the UE currently registers. If the packet data gateway (PGW) registers the location report event to the MME, the MME may carry user location information in the Create Session Request or the Modify Bearer Request to indicate the NHN-ID selected currently by the UE. The SGW forwards this information to the PGW so that the Policy, Control, and Charging (PCC) entity uses the specific PCC policy for the NH network having the NHN-ID and currently serving the UE. If the MME fails to successfully obtain the context information of the UE through the NHN-ID and the GUTI, the MME sends the TAU reject message to the UE. After the UE receives the TAU reject message sent by the MME, the UE may initiate the attach procedure based on the PSP and carry the PSP-ID in the attach request so that the core network performs the authorization procedure and the network registration procedure of the UE again.

In order to explain the method for accessing a network by a UE provided in some embodiments of the present disclosure more clearly, a case in which the second network identifier is different from the first network identifier and is not in the network identifier set of networks equivalent to the first network, and the identifier of the second service provider is the same as the identifier of the first service provider, i.e., the PSP-ID is not changed, the NHN-ID is changed, and the NHN-ID is not an equivalent NHN-ID, the UE needs to initiate the attach procedure based on the PSP to perform the authorization procedure and the network registration procedure again in the service provider having the PSP-ID selected by the UE because the NHN-ID selected by the UE does not belong to networks equivalent to the first network. The MME does not need to obtain the context information of the UE in the network, and thus the attach request of the UE carries only the PSP-ID of the PSP with which the UE registered. After the MME receives the attach request sent by the UE, the MME determines a corresponding AAA server according to the PSP-ID carried in the attach request. The MME performs the authentication and authorization procedure to the UE through the AAA server. After the authentication and authorization procedure to the UE is successful performed through the AAA server corresponding to the PSP-ID, the MME establishes the default bearer for the UE.

In some embodiments of the present disclosure, if the subscription information of the UE in the Authentication, Authorization and Accounting server of the first service provider includes information about the network identifier set of networks equivalent to the first network and identifiers of service providers equivalent to the first service provider, this means that the core network may share the context information of the UE and re-authentication of the UE is not needed when the UE registers with the service providers equivalent to the first service provider and accesses the network equivalent to the first network. If the subscription information of the UE in the Authentication, Authorization and Accounting server of the first service provider includes information about the network identifier set of networks equivalent to the first network, this means that the core network may share the context information of the UE and re-authentication of the UE is not needed when the UE registers with the first service provider and accesses the networks equivalent to the first network.

Figure 9:
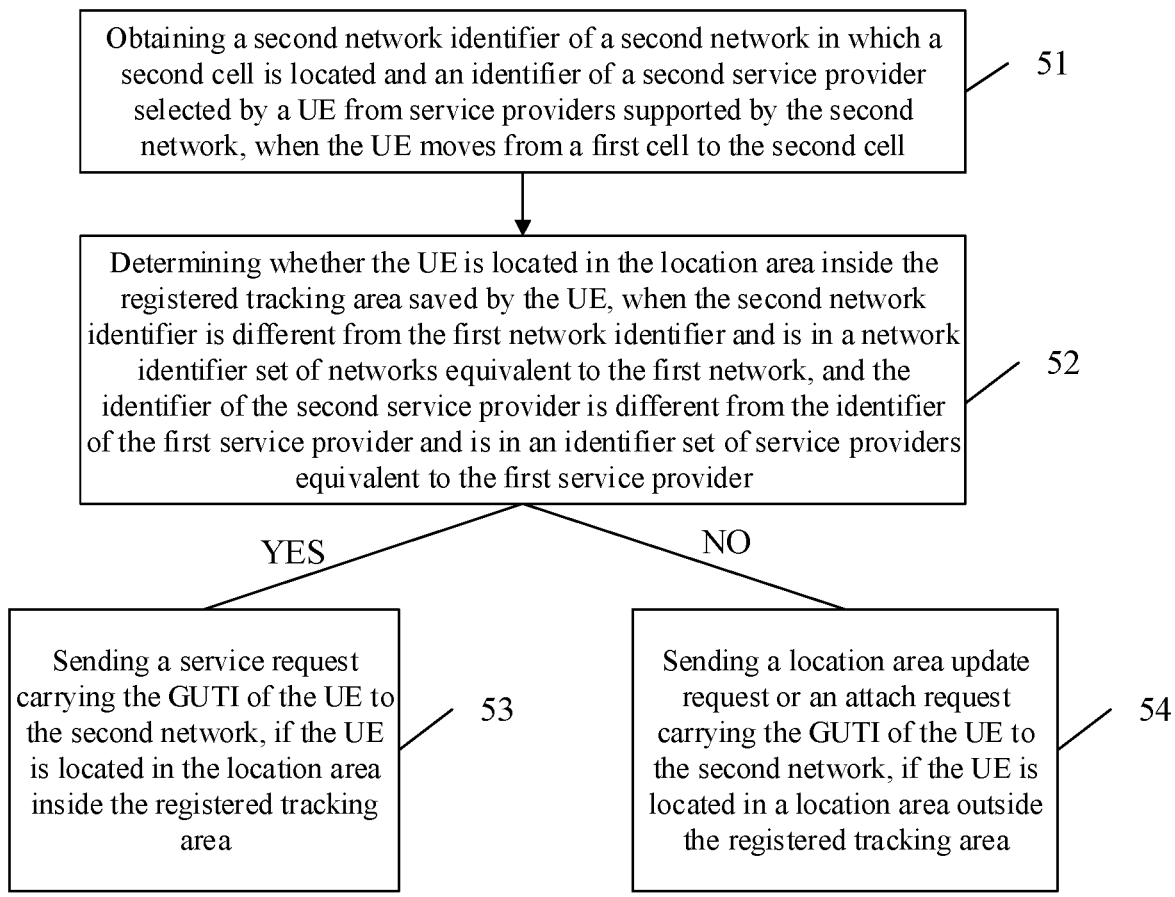
FIG. 9 is a flowchart of a method for accessing a network by a UE provided in some embodiments of the present disclosure.

As shown in FIG. 9, some embodiments of the present disclosure provide a method for accessing a network by a UE. The method includes steps 51-54.

Step 51: the same as the above step 11.

Step 52: determining whether the UE is located in the location area inside the registered tracking area saved by the UE, when the second network identifier is different from the first network identifier and is in the network identifier set of networks equivalent to the first network, and the identifier of the second service provider is different from the identifier of the first service provider and is in the identifier set of service providers equivalent to the first service provider.

Step 53: sending the service request carrying the GUTI of the UE to the second network, if the UE is in the location area inside the registered tracking area.

Step 54: sending the location area update request or the attach request carrying the GUTI of the UE to the second network, if the UE is in the location area outside the registered tracking area.

This embodiment of the present disclosure is directed to a case that the second network identifier is different from the first network identifier and is in the network identifier set of networks equivalent to the first network, and the identifier of the second service provider is different from the identifier of the first service provider and is in the identifier set of service providers equivalent to the first service provider, i.e., the PSP-ID is changed and is an equivalent PSP-ID and the NHN-ID is changed and is an equivalent NHN-ID, the UE may initiate the service request procedure to change the state of the UE from the idle state to the connected state, or the UE may initiate the TAU procedure or the attach procedure based on the GUTI, to inform the core network that the service location area of the UE has changed.

Specifically, as shown in FIG. 10, when the UE is located in the location area inside the registered TA and traffic for the UE arrives or the paging message is received by the UE, the UE may initiate the SR procedure to change the state of the UE from the idle state to the connected state. When the UE moves into the location area outside the registered TA, the UE may initiate the TAU procedure or the attach procedure based on the GUTI, to inform the core network that the serving location area of the UE has changed. In this embodiment, the location area inside the registered TA of the UE may include location areas in the networks equivalent to the first network only. Since the PSP-ID is changed, the TAU request or the attach request sent by the UE may also carry the new PSP-ID. After the MME receives the new PSP-ID sent by the UE, the MME updates the PSP-ID of the service provider currently serving the UE, and may not perform the authentication procedure and the network registration procedure to the UE again. The TAU request or the attach request carries the GUTI assigned to the UE by the core network in respect of the NH network having the previous NHN-ID. When the MME receives the TAU request or the attach request sent by the UE, the MME requests context information of the UE from a previous MME with which the UE registered, according to the GUTI, and the NHN-ID of the NH network currently serving the UE is updated with the new NHN-ID (i.e., the second network identifier). The context information of the UE includes the PSP-ID of the PSP with which the UE previously registered and security context information of the UE. After the MME successfully obtains the context information of the UE, the MME may update the NHN-ID of the NH network currently serving the UE, without performing the authorization procedure of the UE again, initiating the Create Session Request to the new SGW to create a session in the new SGW, or sending the Modify Bearer Request to the SGW to inform the SGW of the MME with which the UE currently registers. If the PGW registers the location report event to the MME, the MME may carry user location information in the Create Session Request or the Modify Bearer Request to indicate the NHN-ID selected currently by the UE. The SGW forwards this information to the PGW so that the Policy, Control, and Charging (PCC) entity uses the specific PCC policy for the NH network having the NHN-ID and currently serving the UE. If the MME fails to successfully obtain the context information of the UE through the NHN-ID and the GUTI, the MME sends the TAU reject message to the UE. After the UE receives the TAU reject message sent by the MME, the UE may initiate the attach procedure based on the PSP and carry the PSP-ID in the attach request so that the core network performs the authorization procedure and the network registration procedure of the UE again.

In order to explain the method for accessing a network by a UE provided in the embodiments of the present disclosure more clearly, a case in which the second network identifier is different from the first network identifier, the identifier of the second service provider is different from the identifier of the first service provider, and the second network identity is not in the network identifier set of networks equivalent to the first network or the identifier of the second service provider is not in the identifier set of service providers equivalent to the first service provider, i.e., the PSP-ID is changed, the NHN-ID is changed, and the NHN-ID is not an equivalent NHN-ID or the PSP-ID is not an equivalent PSP-ID. Specifically, since the PSP-ID selected by the UE does not belong to the equivalent PSP-ID or the NHN-ID does not belong to the equivalent NHN-ID, the UE needs to initiate the attach procedure based on the PSP to perform the authentication procedure and the network registration procedure in the service provider having the PSP-ID selected by the UE, the MME does not need to obtain the context information of the UE in the network, and thus the attach request of the UE only needs to carry the selected PSP-ID. After the MME receives the attach request sent by the UE, the MME may obtain the NHN-ID currently selected by the UE according to a MultiFire (MF) access point message, and determine a corresponding AAA server according to the PSP-ID carried in the attach request. The MME performs the authentication and authorization procedure to the UE through the AAA server. After the authentication and authorization procedure to the UE is successful performed through the AAA server corresponding to the PSP-ID, the MME establishes the default bearer for the UE.

In some embodiments of the present disclosure, if the subscription information of the UE in the Authentication, Authorization and Accounting server of the first service provider includes information of service providers equivalent to the first service provider, this means that the core network may share the context information of the UE and re-authentication of the UE is not needed when the UE registers with the service providers equivalent to the first service provider and the NHN-ID is not changed.

As shown in FIG. 11, some embodiments of the present disclosure provide a method for accessing a network by a UE. The method includes steps 61-62.

Step 61: the same as the above step 11.

Step 62: sending the access request carrying the GUTI of the UE to the second network, when the identifier of the second service provider is different from the identifier of the first service provider and is in the identifier set of service providers equivalent to the first service provider, and the second network identifier is the same as the first network identifier.

Specifically, when the identifier of the second service provider is different from the identifier of the first service provider, and the identifier of the second service provider is in the identifier set of service providers equivalent to the first service provider, and the second network identifier is the same as the first network identifier, whether the UE currently is located in the location area inside the registered tracking area saved by the UE may be determined.

If the UE is in the location area inside the registered tracking area, the service request carrying the GUTI of the UE is sent to the second network.

If the UE is in the location area outside the registered tracking area, the location area update request or the attach request carrying the GUTI (Globally Unique Temporary Identifier) of the UE is sent to the second network.

This embodiment of the present disclosure is directed to a case that the identifier of the second service provider is different from the identifier of the first service provider, and the identifier of the second service provider is in the identifier set of service providers equivalent to the first service provider, and second network identifier is the same as the first network identifier, i.e., the PSP-ID is changed but is an equivalent PSP-ID and the NHN-ID is unchanged, the UE may initiate the service request procedure to change the state of the UE from the idle state to the connected state, or the UE may initiate the TAU procedure or the attach procedure based on the GUTI, to inform the core network that the service location area of the UE has changed.

Figure 12:
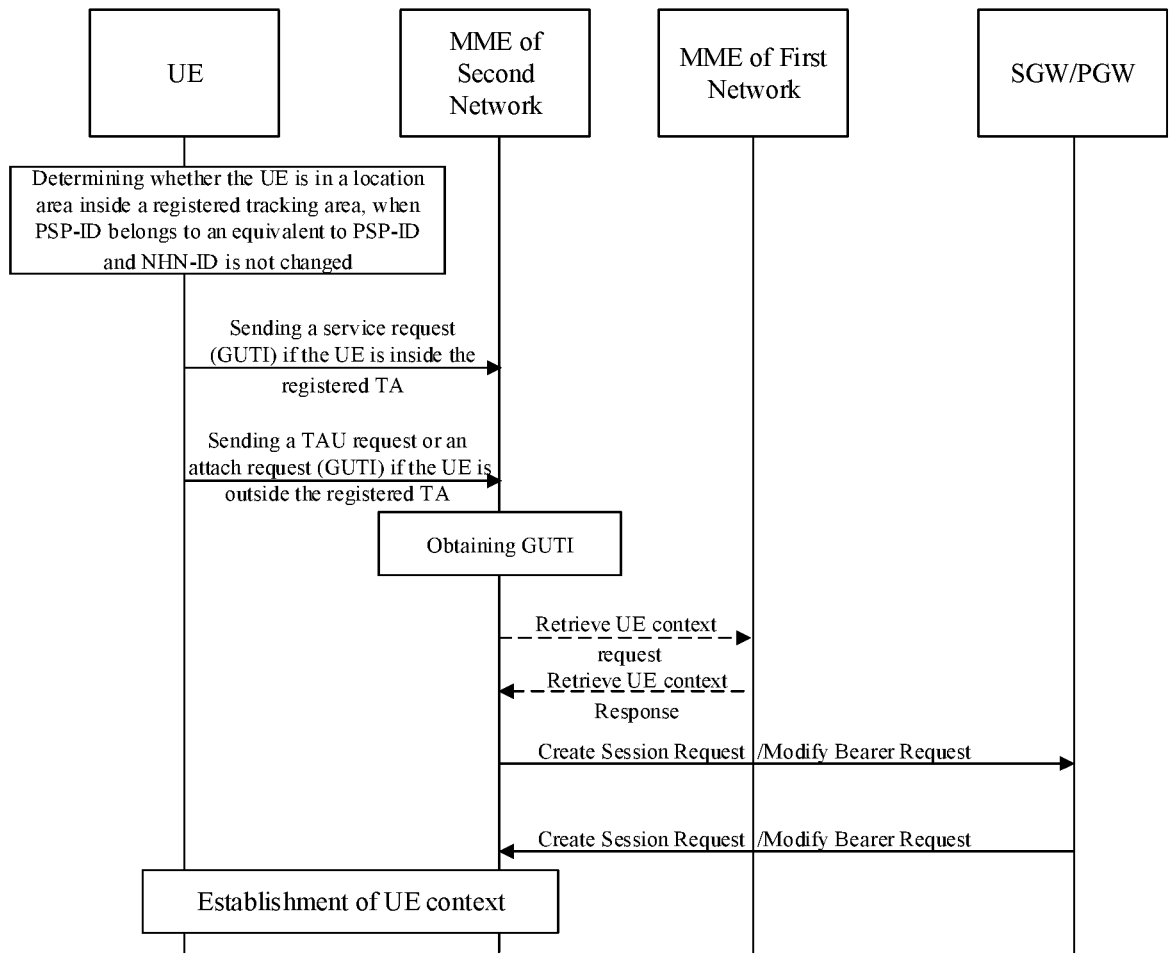
FIG. 12 is a signaling diagram of a method for accessing a network by a UE provided in some embodiments of the present disclosure.

Specifically, as shown in FIG. 12, when the UE is located in the location area inside the registered TA and traffic for the UE arrives or the paging message is received by the UE, the UE may initiate the SR procedure to change the state of the UE from the idle state to the connected state. When the UE moves into the location area outside the registered TA, the UE may initiate the TAU procedure or the attach procedure based on the GUTI, to inform the core network that the serving location area of the UE has changed. In this embodiment, the location area inside the registered TA of the UE may include a location area in the first network only. The TAU request or the attach request carries the GUTI assigned to the UE by the core network in respect of the NH network having the previous NHN-ID. When the MME receives the TAU request or the attach request sent by the UE, the MME requests context information of the UE from a previous MME with which the UE registered, according to the GUTI, and the NHN-ID of the NH network currently serving the UE is updated with the new NHN-ID (i.e., a second network identifier). The context information of the UE includes the PSP-ID of the PSP with which the UE previously registered and the security context information of the UE. After the MME successfully obtains the context information of the UE, the MME may update the NHN-ID of the NH network currently serving the UE, without performing the authentication procedure of the UE again, initiating the Create Session Request to the new SGW to create a session in the new SGW, or sending the Modify Bearer Request to the SGW to inform the SGW of the MME with which the UE currently registers. If the PGW registers the location report event to the MME, the MME may carry user location information in the Create Session Request or the Modify Bearer Request to indicate the NHN-ID selected currently by the UE. The SGW forwards this information to the PGW so that the Policy, Control, and Charging (PCC) entity uses the specific PCC policy for the NH network having the NHN-ID and currently serving the UE. If the MME fails to successfully obtain the context information of the UE through the NHN-ID and the GUTI, the MME sends the TAU reject message to the UE. After the UE receives the TAU reject message sent by the MME, the UE may initiate the attach procedure based on the PSP and carry the PSP-ID in the attach request so that the core network performs the authentication procedure and the network registration procedure of the UE again.

In order to illustrate the method for accessing a network by a UE provided in some embodiments of the present disclosure more clearly, a case in which the identifier of the second service provider is different from the identifier of the first service provider, and the identifier of the second service provider is not in the identifier set of the service providers equivalent to the first service provider, and the second network identifier the same as the first network identifier, i.e., the PSP-ID is changed and is not an equivalent PSP-ID and the NHN-ID is not changed is discussed below. Specifically, since the PSP-ID selected by the UE does not belong to a PSP equivalent to the PSP with which the UE has registered, the UE needs to initiate the attach procedure based on the PSP to perform the authentication procedure and the network registration procedure in the service provider having the PSP-ID selected by the UE, the MME does not need to obtain the context information of the UE in the network, and thus the attach request of the UE only needs to carry the PSP-ID of a PSP with which the UE needs to register. After the MME receives the attach request sent by the UE, the MME determines a corresponding AAA server according to the PSP-ID carried in the attach request. The MME performs the authentication and authorization procedure to the UE through the AAA server. After the authentication and authorization procedure to the UE is successful performed through the AAA server corresponding to the PSP-ID, the MME establishes the default bearer for the UE.

It should be explained that in the technical solution provided in the embodiments, as long as the second network identifier is different from the first network identifier, the UE needs to initiate the attach procedure based on the PSP to perform the authentication procedure and the network registration procedure in the PSP having the new PSP-ID, whether the identifier of the second service provider is the same as the identifier of the first service provider or not. Since the MME does not need to obtain the context information of the UE in the network, the attach request of the UE only needs to carry the selected PSP-ID. After the MME receives the attach request sent by the UE, the MME determines a corresponding AAA server according to the PSP-ID carried in the attach request. The MME performs the authentication and authorization procedure to the UE through the AAA server. After the authentication and authorization procedure to the UE is successful performed through the AAA server corresponding to the PSP-ID, the MME establishes the default bearer and the network registration for the UE.

Figure 13:
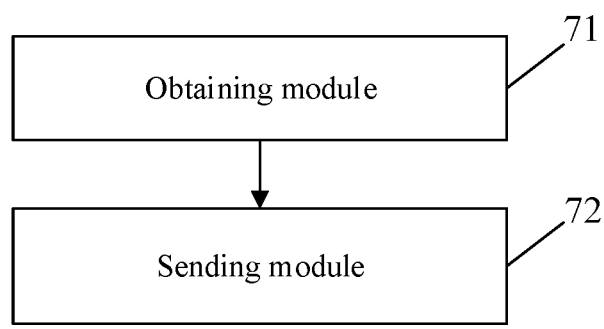
FIG. 13 is a structural diagram of a device for accessing a network by a User Equipment (UE) provided in some embodiments of the present disclosure.
Figure 14:
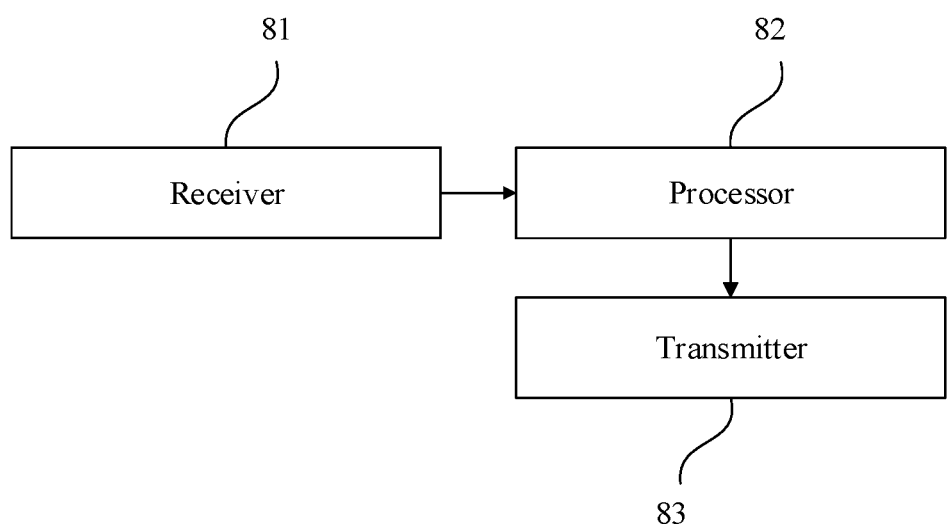
FIG. 14 is a structural diagram of a User Equipment provided in some embodiments of the present disclosure.

As shown in FIG. 13, some embodiments of the present disclosure provide a device for accessing a network by a User Equipment (UE). The device includes an obtaining module 71 and a sending module 72.

The obtaining module 71 is configured to obtain a second network identifier of a second network in which a second cell is located and an identifier of a second service provider selected by the UE from service providers supported by the second network, when the UE moves from a first cell to the second cell.

The sending module is configured to send an access request carrying a Globally Unique Temporary Identifier (GUTI) of the UE to the second network to access the second network, when the second network identifier is different from a first network identifier of the first network in which the first cell is located, or when the identifier of the second service provider is different from an identifier of a first service provider with which the UE registers in service providers supported by the first network.

In this embodiment of the present disclosure, the sending module 71 includes: a first sending submodule configured to send the access request carrying the GUTI of the UE to the second network, when the second network identifier is different from the first network identifier and the identifier of the second service provider is the same as the identifier of the first service provider.

In this embodiment of the present disclosure, the sending module 71 includes: a second sending submodule configured to send the access request carrying the GUTI of the UE to the second network, when the second network identifier is different from the first network identifier and is in a network identifier set of networks equivalent to the first network, and the identifier of the second service provider is different from the identifier of the first service provider and is in an identifier set of service providers equivalent to the first service provider.

In this embodiment of the present disclosure, the first sending submodule includes: a first determination unit configured to determine whether the UE is currently located in a location area inside a registered tracking area saved by the UE, when the second network identifier is different from the first network identifier and the identifier of the second service provider is the same as the identifier of the first service provider; a first request unit configured to send a service request carrying the GUTI of the UE to the second network, if the UE is located in the location area inside the registered tracking area; and a second request unit configured to send a location area update request or an attach request carrying the GUTI of the UE to the second network if the UE is located in a location area outside the registered tracking area.

In this embodiment of the present disclosure, the first sending submodule includes: a second determination unit configured to determine whether the UE is currently located in the location area inside the registered tracking area saved by the UE, when the second network identifier is different from the first network identifier and is in a network identifier set of network equivalent to the first network, and the identifier of the second service provider is the same as the identifier of the first service provider; a third request unit configured to send the service request carrying the GUTI of the UE to the second network, if the UE is located in the location area inside the registered tracking area; a fourth request unit configured to send the location area update request or the attach request carrying the GUTI of the UE to the second network, if the UE is located in the location area outside the registered tracking area.

In this embodiment of the present disclosure, the second sending submodule includes: a third determination unit configured to determine whether the UE is currently located in the location area inside the registered tracking area saved by the UE, when the second network identifier is different from the first network identifier and is in the network identifier set of networks equivalent to the first network, and the identifier of the second service provider is different from the identifier of the first service provider and is in the identifier set of service providers equivalent to the first service provider; a fifth request unit configured to send the service request carrying the GUTI of the UE to the second network, if the UE is in the location area inside the registered tracking area; and a sixth request unit configured to send the location area update request or the attach request carrying the GUTI of the UE to the second network, if the UE is located in the location area outside the registered tracking area.

In this embodiment of the present disclosure, the sending module 71 includes: a third sending submodule configured to send the access request carrying the GUTI of the UE to the second network, when the identifier of the second service provider is different from the identifier of the first service provider and is in the identifier set of service providers equivalent to the first service provider, and the second network identifier is the same as the first network identifier.

In this embodiment of the present disclosure, the third sending submodule includes: a fourth determination unit configured to determine whether the UE currently is located in the location area inside the registered tracking area saved by the UE, when the identifier of the second service provider is different from the identifier of the first service provider and is in the identifier set of service providers equivalent to the first service provider, and the second network identifier is the same as the first network identifier; a seven request unit configured to send the service request carrying the GUTI of the UE to the second network, if the UE is located in the location area inside the registered tracking area; and an eighth request unit configured to send the location area update request or the attach request carrying the GUTI of the UE to the second network, if the UE is located in the location area outside the registered tracking area.

The device in this embodiment is a device capable of performing the method in the above embodiment correspondingly, and all implementations in the method in the above embodiment are applicable to the device in this embodiment and may achieve the same technical effect.

Some embodiments of the present disclosure provide a User Equipment (UE). The UE includes: a receiver 81 configured to receive a second network identifier of a second network in which a second cell is located and an identifier of a second service provider selected by the UE from service providers supported by the second network, when the UE moves from a first cell to the second cell; a processor 82 connected to the receiver 81; and a transmitter 83 connected to the processor 82. The processor 82 is configured to generate an access request carrying a Globally Unique Temporary Identifier (GUTI) of the UE, when the second network identifier is different from a first network identifier of a first network in which the first cell is located, or when an identifier of the second service provider is different from an identifier of a first service provider with which the UE registers in service providers supported by the first network.

The transmitter 83 is configured to send the access request carrying the GUTI of the UE to the second network to access the second network.

The processor 82 may be configured to implement functions of the modules, submodules or units in the device in the above embodiments, and may achieve same technical effects as those of the device in the above embodiments.

It should be noted that, the UE in the embodiments of the present disclosure may be a mobile phone (or a handset), or other devices capable of transmitting or receiving wireless signals including a UE (terminal), a personnel digital assistance (PDA), a wireless Modulator and Demodulator (Modem), a wireless communication device, a handhold device, a laptop, a wireless phone, a wireless local loop (WLL) station, a Customer Premise Equipment (CPE) or a MiFi capable of transforming a cellular signal to a WiFi signal, an intelligent household electrical appliance, or other devices capable of automatically communicate with a mobile communication network without operations of a user.

The above embodiments of the present disclosure describe basic principles of the present disclosure. However, it should be understood that one skilled in the art may implement a part or all or any step or component of the method and device in the present disclosure in any computing device (including a processor, a storage, or the like) or in any network including computing devices, in hardware, firmware, software, or a combination thereof, after one skilled in the art reads the present disclosure and uses his/or basic programming skills.

Therefore, the present disclosure may be implemented by a program or a set of programs executed on any computing device. The computing device may be a general device known in the art. Therefore, an objective of the present disclosure may also be implemented by a software product including programs and codes for implementing the method and the device. That is, the software product including the programs and the codes for implementing the method and the device also form a part of the present disclosure, and a storage medium storing the programs and the codes also forms a part of the present disclosure. Obviously, the storage medium may be any storage medium or future storage medium to be developed. It is further pointed out that modules, submodules or units or steps in the method or device in the present disclosure may be decomposed and/or recombined. Such decomposition and/or recombination also belong to equivalent technical solutions of the present disclosure. The steps in the above may be performed in a chronological sequence naturally conceived by one skilled in the art, but do not necessarily be performed in the described sequence. Some of the steps may be performed simultaneously or independently.

A1. a method for accessing a network by a User Equipment (UE), including: obtaining a second network identifier of a second network in which a second cell is located and an identifier of a second service provider selected by the UE from service providers supported by the second network, when the UE moves from a first cell to the second cell; and sending an access request carrying a Globally Unique Temporary identifier (GUTI) of the UE to the second network to access the second network, when the second network identifier is different from a first network identifier of a first network in which the first cell is located, or when the identifier of the second service provider is different from an identifier of a first service provider with which the UE registers in service providers supported by the first network.

A2. The method for accessing a network by a UE according to A1, wherein the sending an access request carrying a GUTI of the UE to the second network when the second network identifier is different from a first network identifier of a first network in which the first cell is located, includes: sending the access request carrying the GUTI of the UE to the second network, when the second network identifier is different from the first network identifier and the identifier of the second service provider is the same as the identifier of the first service provider.

A3. The method for accessing a network by a UE according to A1, wherein the sending an access request carrying a GUTI of the UE to the second network when the second network identifier is different from the first network identifier of the first network in which the first cell is located, includes: sending the access request carrying the GUTI of the UE to the second network, when the second network identifier is different from the first network identifier and the second network identifier is in a network identifier set of networks equivalent to the first network, and the identifier of the second service provider is different from the identifier of the first service provider, and the identifier of the second service provider is in an identifier set of service providers equivalent to the first service provider.

A4. The method for accessing a network by a UE according to A2, wherein, the sending the access request carrying the GUTI of the UE to the second network when the second network identifier is different from the first network identifier, and the identifier of the second service provider is the same as the identifier of the first service provider, includes: determining whether the UE is located in a location area inside a registered tracking area saved by the UE, when the second network identifier is different from the first network identifier, and the identifier of the second service provider is the same as the identifier of the first service provider; and sending a service request carrying the GUTI of the UE to the second network, if the UE is located in the location area inside the registered tracking area.

A5. The method for accessing a network by a UE according to A2, wherein, sending the access request carrying the GUTI of the UE to the second network when the second network identifier is different from the first network identifier, and the identifier of the second service provider is the same as the identifier of the first service provider, includes: determining whether the UE is currently located in a location area inside a registered tracking area saved by the UE, when the second network identifier is different from the first network identifier, and the identifier of the second service provider is the same as the identifier of the first service provider; sending a location area update request or the attach request carrying the GUTI of the UE to the second network, if the UE is located in a location area outside the registered tracking area.

A6. The method for accessing a network by a UE according to A2, wherein, the sending the access request carrying the GUTI of the UE to the second network when the second network identifier is different from the first network identifier, and the identifier of the second service provider is the same as the identifier of the first service provider, includes: determining whether the UE is currently located in a location area inside a registered tracking area saved by the UE, when the second network identifier is different from the first network identifier, and the second network identifier is in a network identifier set of networks equivalent to the first network, and the identifier of the second service provider is the same as the identifier of the first service provider; and sending a service request carrying the GUTI of the UE to the second network, if the UE is located in the location area inside the registered tracking area.

A7. The method for accessing a network by a UE according to A2, wherein, the sending the access request carrying the GUTI of the UE to the second network when the second network identifier is different from the first network identifier, and the identifier of the second service provider is the same as the identifier of the first service provider, includes: determining whether the UE is currently located in a location area inside a registered tracking area saved by the UE when the second network identifier is different from the first network identifier, and second network identifier is in a network identifier set of networks equivalent to the first network, and the identifier of the second service provider is the same as the identifier of the first service provider; and sending a location area update request or an attach request carrying the GUTI of the UE to the second network, if the UE is located in a location area outside the registered tracking area.

A8. The method for accessing a network by a UE according to A3, wherein, the sending the access request having the GUTI of the UE to the second network, when the second network identifier is different from the first network identifier and the second network identifier is in a network identifier set of networks equivalent to the first network, and the identifier of the second service provider is different from the identifier of the first service provider, and the identifier of the second service provider is in an identifier set of service providers equivalent to the first service provider, includes: determining whether the UE is currently located in a location area inside a registered tracking area saved by the UE, when the second network identifier is different from the first network identifier, and the second network identifier is in the network identifier set of networks equivalent to the first network, and the identifier of the second service provider is different from the identifier of the first service provider, and the identifier of the second service provider is in the identifier set of service providers equivalent to the first service provider; and sending a service request carrying the GUTI of the UE to the second network if the UE is currently located in the location area inside the registered tracking area.

A9. The method for accessing a network by a UE according to A3, wherein, the sending the access request carrying the GUTI of the UE to the second network, when the second network identifier is different from the first network identifier and the second network identifier is in a network identifier set of networks equivalent to the first network, and the identifier of the second service provider is different from the identifier of the first service provider, and the identifier of the second service provider is in an identifier set of service providers equivalent to the first service provider, includes: determining whether the UE is currently located in a location area inside a registered tracking area saved by the UE, when the second network identifier is different from the first network identifier, and second network identifier is in the network identifier set of networks equivalent to the first network, and the identifier of the second service provider is different from the identifier of the first service provider, and the identifier of the second service provider is in the identifier set of service providers equivalent to the first service provider; and sending a location area update request or an attach request carrying the GUTI of the UE to the second network, if the UE is in a location area outside the registered tracking area.

A10. The method for accessing a network by a UE according to A1, wherein, the sending an access request carrying a Globally Unique Temporary Identifier (GUTI) of the UE to the second network when the identifier of the second service provider is different from an identifier of a first service provider with which the UE registers from service providers supported by the first network, includes: sending the access request carrying the GUTI of the UE to the second network, when the identifier of the second service provider is different from the identifier of the first service provider, and the identifier of the second service provider is in an identifier set of service providers equivalent to the first service provider, and the second network identifier is the same as the first network identifier.

A11. The method for accessing a network by a UE according to A10, wherein, the sending the access request carrying the GUTI of the UE to the second network, when the identifier of the second service provider is different from the identifier of the first service provider, and the identifier of the second service provider is in an identifier set of service providers equivalent to the first service provider, and the second network identifier is the same as the first network identifier, includes: determining whether the UE currently is located in a location area inside a registered tracking area saved by the UE, when the identifier of the second service provider is different from the identifier of the first service provider, and the identifier of the second service provider is in the identifier set of service providers equivalent to the first service provider, and the second network identifier is the same as the first network identifier; and sending a service request carrying the GUTI of the UE to the second network, if the UE is in the location area inside the registered tracking area.

A12. The method for accessing a network by a UE according to A10, wherein, the sending an access request carrying the GUTI of the UE to the second network, when the identifier of the second service provider is different from the identifier of the first service provider, and the identifier of the second service provider is in an identifier set of service providers equivalent to the first service provider, and the second network identifier is the same as the first network identifier, includes: determining whether the UE currently is located in a location area inside a registered tracking area saved by the UE, when the identifier of the second service provider is different from the identifier of the first service provider, and the identifier of the second service provider is in the identifier set of service providers equivalent to the first service provider, and the second network identifier is the same as the first network identifier; and sending a location area update request or an attach request carrying the GUTI of the UE to the second network, if the UE is located in a location area outside the registered tracking area.

B13. A device for accessing a network by a User Equipment (UE), including: an obtaining module configured to obtain a second network identifier of a second network in which a second cell is located and an identifier of a second service provider selected by the UE from service providers supported by the second network, when the UE moves from a first cell to the second cell; and a sending module configured to send an access request having a Globally Unique Temporary Identifier (GUTI) of the UE to the second network to access the second network, when the second network identifier is different from a first network identifier of a first network in which the first cell is located, or when the identifier of the second service provider is different from the identifier of the first service provider with which the UE registers in service providers supported by the first network.

C14. A User Equipment, including: a receiver configured to receive a second network identifier of a second network in which a second cell is located and an identifier of a second service provider selected by the UE from service providers supported by the second network, when the UE moves from a first cell to the second cell, wherein the first cell is a cell in which the UE camps on currently; a processor connected to the receiver and configured to generate an access request carrying a Globally Unique Temporary Identifier (GUTI) of the UE, when the second network identifier is different from a first network identifier of a first network in which the first cell is located, or when the identifier of the second service provider is different from an identifier of a first service provider with which the UE registers in service providers supported by the first network; and a transmitter connected to the processor and configured to send the access request carrying the GUTI of the UE to the second network to access the second network.

The above described embodiments of the present disclosure are optional embodiments. It should be noted that numerous modifications and embellishments may be made by one of ordinary skills in the art without departing from the spirit of the present disclosure, and such modifications and embellishments also fall within the scope of the present disclosure.

What is claimed is:

1. A method for accessing a network by a User Equipment (UE), comprising:
   obtaining a second network identifier of a second network in which a second cell is located and an identifier of a second service provider selected by the UE from service providers supported by the second network, when the UE moves from a first cell to the second cell; and
   before the UE establishes a bearer with the second network sending an access request carrying a Globally Unique Temporary Identifier (GUTI) of the UE to the second network to access the second network, when the second network identifier is different from a first network identifier of a first network in which the first cell is located, or when the identifier of the second service provider is different from an identifier of a first service provider with which the UE registers, in service providers supported by the first network, wherein the GUTI of the UE is assigned to the UE when the UE is in the first network,
   wherein sending the access request carrying the GUTI of the UE to the second network when the second network identifier is different from the first network identifier of the first network in which the first cell is located comprises;
   sending the access request carrying the GUTI of the UE to the second network, when the second network identifier is different from the first network identifier and the second network is in a network identifier set of networks equivalent to the first network and the identifier of the second service provider is different from the identifier of the first service providers equivalent to the first service provider,
   or,
   the sending an access request carrying a Globally Unique temporary Identifier (GUTI) of the UE to the second network, when the identifier of the second service provider is different from an identifier of a first service provider with which the UE registers in service providers supported by the first network comprises:
   sending the access request carrying the GUTI of the UE to the second network, when the identifier of the second service provider is different from the identifier of the first service provider, and the identifier of the second service provider is in an identifier set of service providers equivalent to the first service provider, and the second network identifier is the same as the first network identifiers.

2. The method for accessing a network by a UE according to claim 1, wherein, the sending the access request carrying the GUTI of the UE to the second network, when the second network identifier is different from the first network identifier and the second network identifier is in a network identifier set of networks equivalent to the first network, and the identifier of the second service provider is different from the identifier of the first service provider, and the identifier of the second service provider is in an identifier set of service providers equivalent to the first service provider, comprises:
   determining whether the UE is currently located in a location area inside a registered tracking area saved by the UE, when the second network identifier is different from the first network identifier, and the second network identifier is in the network identifier set of networks equivalent to the first network, and the identifier of the second service provider is different from the identifier of the first service provider, and the identifier of the second service provider is in the identifier set of service providers equivalent to the first service provider; and
   sending a service request carrying the GUTI of the UE to the second network, if the UE is located in the location area inside the registered tracking area.

3. The method for accessing a network by a UE according to claim 1, wherein, the sending the access request carrying the GUTI of the UE to the second network, when the second network identifier is different from the first network identifier and the second network identifier is in a network identifier set of networks equivalent to the first network, and the identifier of the second service provider is different from the identifier of the first service provider, and the identifier of the second service provider is in an identifier set of service providers equivalent to the first service provider, comprises:
   determining whether the UE is currently located in a location area inside a registered tracking area saved by the UE, when the second network identifier is different from the first network identifier, and the second network identifier is in the network identifier set of networks equivalent to the first network, and the identifier of the second service provider is different from the identifier of the first service provider, and the identifier of the second service provider is in the identifier set of service providers equivalent to the first service provider; and
   sending a location area update request or an attach request carrying the GUTI of the UE to the second network, if the UE is in a location area outside the registered tracking area.

4. The method for accessing a network by a UE according to claim 1, wherein, the sending the access request carrying the GUTI of the UE to the second network, when the identifier of the second service provider is different from the identifier of the first service provider, and the identifier of the second service provider is in an identifier set of service providers equivalent to the first service provider, and the second network identifier is the same as the first network identifier, comprises:
   determining whether the UE currently is located in a location area inside a registered tracking area saved by the UE, when the identifier of the second service provider is different from the identifier of the first service provider, and the identifier of the second service provider is in the identifier set of service providers equivalent to the first service provider, and the second network identifier is the same as the first network identifier; and sending a service request carrying the GUTI of the UE to the second network, if the UE is in the location area inside the registered tracking area.

5. The method for accessing a network by a UE according to claim 1, wherein, the sending the access request carrying the GUTI of the UE to the second network, when the identifier of the second service provider is different from the identifier of the first service provider, and the identifier of the second service provider is in an identifier set of service providers equivalent to the first service provider, and the second network identifier is the same as the first network identifier, comprises:

determining whether the UE currently is located in a location area inside a registered tracking area saved by the UE, when the identifier of the second service provider is different from the identifier of the first service provider, and the identifier of the second service provider is in the identifier set of service providers equivalent to the first service provider, and the second network identifier is the same as the first network identifier; and sending a location area update request or an attach request carrying the GUTI of the UE to the second network, if the UE is located in a location area outside the registered tracking area.

6. A User Equipment, comprising:

a receiver configured to receive a second network identifier of a second network in which a second cell is located and an identifier of a second service provider selected by the User Equipment (UE) from service providers supported by the second network, when the UE moves from a first cell to the second cell;

a processor connected to the receiver and configured to generate an access request carrying a Globally Unique Temporary Identifier (GUTI) of the UE, when the second network identifier is different from a first network identifier of a first network in which the first cell is located, or when the identifier of the second service provider is different from an identifier of a first service provider with which the UE registers, in service providers supported by the first network, wherein the GUTI of the UE is assigned to the UE when the UE is in the first network; and a transmitter connected to the processor and configured to, before the UE establishes a bearer with the second network, send the access request carrying the GUTI of the UE to the second network to access the second network, wherein, the transmitter is further configured to;

send the access request carrying the GUTI of the UE to the second network, when the second network identifier is different from the first network identifier and the second network identifier is in a network identifier set of networks equivalent to the first network, and the identifier of the second service provider is different from the identifier of the first service provider and the identifier of the second service provider is in an identifier wet of service providers equivalent to the first service provider, or, send the access request carrying the GUTI of the UE to the second network, when the identifier of the second service provider is different from the identifier of the first service provider, and the identifier of the second service provider is in an identifier set of service providers equivalent to the first service provider, and the second network identifier is the same as the first network identifier.

7. A non-transitory computer readable storage medium, comprising:

computer readable instructions executable by a processor and stored on the non-volatile computer readable storage medium, wherein, when the computer readable instructions are executed by the processor, the processor performs a method for accessing a network by a User Equipment (UE), the method comprises:

obtaining a second network identifier of a second network in which a second cell is located and an identifier of a second service provider selected by the UE from service providers supported by the second network, when the UE moves from a first cell to the second cell; and before the UE establishes a bearer with the second network, sending an access request carrying a Globally Unique Temporary Identifier (GUTI) of the UE to the second network to access the second network, when the second network identifier is different from a first network identifier of a first network in which the first cell is located, or when the identifier of the second service provider is different from an identifier of a first service provider with which the UE registers, in service providers supported by the first network, wherein the GUTI of the UE is assigned to the UE when the UE is in the first network, wherein sending the access request carrying the GUTI of the UE to the second network when the second network identifier is different from the first network identifier of the first network in which the first cell is located, comprises:

sending the access request carrying the GUTI of the UE to the second network, when the second network identifier is different from the first network identifier and the second network identifier is in a network identifier set of networks equivalent to the first network, and the identifier of the second service provider is different from the identifier of the first service provider, and the identifier of the second service provider is in an identifier set of service providers equivalent to the first service provider, or, the sending an access request carrying a Globally Unique Temporary Identifier (GUTI) of the UE to the second network, when the identifier of the second service provider is different from an identifier of a first service provider with which the UE registers, in service providers supported by the first network, comprises:

sending the access request carrying the GUTI of the UE to the second network, when the identifier of the second service provider is different from the identifier of the first service provider, and the identifier of the second service provider is in an identifier set of service providers equivalent to the first service provider, and the second network identifier is the same as the first network identifier.

* * * * *